3,121,730
PRODUCTION OF ESTERS OF ALPHA, BETA-OLEFINIC UNSATURATED SULFURIC ACIDS AND AROMATIC HYDROXY COMPOUNDS
Harry Distler, Ludwigshafen (Rhine), Germany, assignor to Badische Anilin- & Soda-Fabrik Aktiengesellschaft, Ludwigshafen (Rhine), Germany
No Drawing. Filed July 15, 1960, Ser. No. 43,009
Claims priority, application Germany July 18, 1959
3 Claims. (Cl. 260—456)

This invention relates to a process for the production of esters of alpha, beta-olefinic unsaturated sulfonic acids by the reaction of a sulfonic acid chloride with an aromatic hydroxy compound.

It is known that vinylsulfonic acid phenyl ester can be obtained by reacting vinyl sulfochloride with an alkali phenolate in organic solvents. However, the yields are not satisfactory in this process. Another disadvantage of the prior art method is that the phenol must be converted into an alkali phenolate before the reaction. Water-free alkali phenolates, it is known, can be prepared only with difficulty on an industrial scale. Furthermore, the vinyl sulfochloride also must be prepared separately from the readily available beta-chloroethane sulfochloride.

It is an object of the invention to provide a process for the production of esters of alpha, beta-olefinic unsaturated sulfonic acids and aromatic hydroxy compounds which gives improved yields. It is another object of the invention to provide a process for the production of esters of alpha, beta-olefinic unsaturated sulfonic acids and aromatic hydroxy compounds in which no alkali salt of the aromatic hydroxy compound need be formed in a preceding step. Still another object is to provide a process which directly starts from the readily available beta-chlorosulfonic acid chlorides. Further objects of the invention will become apparent below.

In accordance with the invention, it has now been found that these objects and advantages are achieved by reacting a sulfonic acid chloride which in beta-position with reference to the sulfonic acid chloride group has a chlorine atom attached to a carbon atom in an aliphatic chain and which in alpha-position with reference to the sulfonic acid chloride group has at least one hydrogen atom attached to a carbon atom in an aliphatic chain, with an aromatic hydroxy compound in an aqueous alkaline medium at a pH value of between 7.5 and 11.5, preferably between 8 and 10.

The reaction of beta-chloroethane sulfonic acid chloride with phenol is represented by way of example by the following scheme:

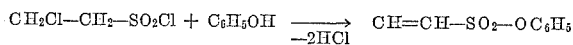

By the novel process it is possible to split off the two molecules of hydrogen chloride simultaneously, i.e. in one reaction step, although it is well known that chlorine atoms attached to aliphatic chains are considerably less reactive than chlorine atoms in sulfonic acid chloride groups. Surprisingly, the chlorine atom bound to an aliphatic chain can be split off under mild conditions which do not appreciably saponify the sensitive sulfonic acid ester group formed in the reaction.

Beta-chlorosulfonic acid chlorides which can be reacted in accordance with this invention have the general formula:

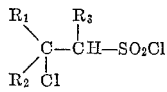
(I)

in which $R_1$, $R_2$ and $R_3$ represent hydrogen, halogen, alkyl, halogenalkyl, cycloalkyl, aryl or aralkyl, the organic substituents having from 1 to about 12 carbon atoms. The most favorable results are achieved with those compounds of the general Formula I in which $R_1$, $R_2$ and $R_3$ stand for hydrogen, chlorine, lower alkyl and lower chloroalkyl, both organic substituents having from 1 to about 4 carbon atoms. The compounds according to the general Formula I are obtainable in a manner known per se by the sulfochlorination of chlorohydrocarbons. Examples of beta-chlorosulfonic acid chlorides which have been found useful in the practice of my invention are: beta-chloroethane sulfonic acid chloride; 2-chloropropane sulfonic acid-(1) chloride; 1-chloropropane sulfonic acid-(2) chloride; 2-chlorohexane sulfonic acid-(1) chloride; 2-chloromethyl-pentane sulfonic acid-(1) chloride; 1,3-dichloropropane sulfonic acid-(2) chloride; 2,3-dichlorobutane sulfonic acid-(1) chloride; 1,3-dichlorobutane sulfonic acid-(2) chloride; 1-chloro-5-(1'-chloroethyl)-pentane sulfonic acid-(5) chloride; beta, beta-dichloroethane sulfonic acid chloride; 1,1,1-trichloroethane sulfonic acid-(2) chloride; 2-chloro-2-methylbutane sulfonic acid-(1) chloride; furthermore, 2-chlorooctane sulfonic acid-(1) chloride; 2-chlorododecane sulfonic acid-(1) chloride; 2-chloromethyl-undecane sulfonic acid-(1) chloride; 2-chloro-2-phenyl-ethane sulfonic acid-(1) chloride and 2-chloro-2-benzyl-ethane sulfonic acid-(1) chloride.

Aromatic hydroxy compounds which can be reacted in accordance with the invention are, generally speaking, hydrocarbon compounds containing at least one carbocyclic aromatic ring and at least one hydroxy group directly attached to a carbocyclic aromatic ring. These compounds may further contain atoms or groups which are inert under the conditions of the reaction.

The preferred aromatic hydroxy compounds are those containing from 1 to 3 carbocyclic aromatic rings and from 1 to 3 hydroxy groups. If the aromatic hydroxy compound contains more than one aromatic ring, the rings may be condensed (such as in naphthalene), linked by a single bond (such as in diphenyl) or linked via a short-chain bridge (such as in diphenylmethane). In the latter case the bridge may be an alkylene group with from 1 to 6 carbon atoms, oxygen, sulfur, —SO—, —SO$_2$—, alkylimino containing from 1 to 4 carbon atoms or acylimino containing an acyl radical of a lower aliphatic carboxylic acid with from 1 to 4 carbon atoms. The following atoms or groups inert under the reaction conditions are named by way of example as substituents in the said aromatic hydroxy compounds: chlorine, bromine, iodine, alkyl with from 1 to about 20 carbon atoms, cycloalkyl with from 6 to 12 carbon atoms, dialkylamino groups with from 2 to 8 carbon atoms, acylamino groups containing a lower aliphatic carboxylic acid radical with from 1 to 4 carbon atoms or an aromatic carboxylic acid radical with 6 or 7 carbon atoms, alkoxy groups containing from 1 to 12 carbon atoms, the carboxylic, sulfonic acid, nitro and cyano groups.

The most satisfactory results are obtained with aromatic hydroxy compounds containing 1 or 2 carbocyclic aromatic rings which are condensed, linked by a single bond or linked by way of an alkylene group having from 1 to 4 carbon atoms, by oxygen, sulfur or —SO$_2$—. These compounds contain 1 or 2 hydroxy groups directly attached to a carbocyclic aromatic ring and may be substituted by chlorine, bromine and/or alkyl with from 1 to 12 carbon atoms.

Suitable aromatic hydroxy compounds are, for example: phenol; the cresols; the xylenols; para-tertiary butylphenol; nonylphenols; dodecylphenols; para-chlorophenol; 2,4-dibromophenol; 2,4,5- and 2,4,6-trichlorophenol; 2,3,4,5,6-pentachlorophenol; 2,4,6-tribromophenol; 4-chloro-2-methylphenol; alpha- and beta-naphthol; 4,4'-dihydroxy diphenyl; 3,3'-dihydroxy diphenyl oxide;

4,4'-dihydroxy diphenyl sulfide; 4,4'-dihydroxy diphenyl methane; 2,2-bis-(4'-hydroxyphenyl)-propane; bis-(4'-hydroxyphenyl)-sulfone; resorcinol; hydroquinone; 4-nitrophenol; 3-cyanophenol; 4,4'-dihydroxydiphenyl sulfoxide; N-methyl-3,3'-dihydroxydiphenyl amine; N-acetyl-di-(p-hydroxyphenyl)-amine; 3-iodophenol; octadecylphenols; 4-cyclohexylphenol; 4-cyclododecylphenol; 4-dibutylamino phenol; 4-methylethylamino-phenol; 4-acetylamino-2-methyl-phenol; 3-benzoylamino-phenol; 4-para-toluylamino-phenol; 3-methoxyphenol; 4-butoxyphenol; salicylic acid and 4-hydroxybenzene sulfonic acid.

In the usual case the sulfonic acid chloride and the aromatic hydroxy compound are reacted in equivalent quantities, i.e., there is used one mole of the sulfonic acid chloride to each of the hydroxy groups present which are to be esterified. Sometimes an excess of one or the other component is recommended. The excess may be for example 5 to 20% or even more.

It is a feature of the novel process that the reaction is carried out in the presence of a large amount of water. The lower limit of this amount depends inter alia on the particular components reacted; it may be about 15% by weight with reference to the total reaction mixture. In the usual case the amount of water employed is from 30 to 80% by weight, preferably from 40 to 60% by weight. There is no criticality with reference to an upper limit. The working up of the reaction mixture becomes, however, less convenient if the share of water appreciably exceeds 90% by weight.

The novel process is carried out in an alkaline medium, preferably at a pH value of between 7.5 and 11.5. The most favorable pH range is between 8 and 10. There is no criticality as to how to maintain the desired alkalinity. The most convenient way is adding a base at such a speed that the split off hydrogen chloride is neutralized and the desired hydroxyl ion concentration is provided. All bases which do not react with either of the components present in the reaction medium can be used. Preferred bases are the oxides, hydroxides and carbonates of the metals of the Ia and IIa groups of the periodic chart, and tertiary amines, such as trimethylamine, tributylamine, dimethylaniline, diethylaniline, pyridine and quinoline. The bases most useful in the practice of my invention are alkali hydroxides in the form of an about 5 to 50% aqueous solution, the percentage being percent by weight. Any base should be employed at least in an amount which is sufficient to combine the split off hydrogen chloride in the form of a salt.

The pH value is controlled in conventional manner. A glass electrode in connection with a calomel electrode can be used inter alia.

The reaction is generally carried out at a temperature of between $-10°$ and $+80°$ C. It is, however, also possible to work at higher temperatures, say up to about 100° C. The preferred temperature range is between $-5°$ and $+40°$ C.

It is recommended to coemploy in the reaction an organic solvent which is inert under the conditions of the reaction. Suitable solvents are inter alia aliphatic, cycloaliphatic or aromatic hydrocarbons, ethers, ketones and halogenated hydrocarbons are aliphatic or cycloaliphatic alcohols. The following solvents are named by way of example: petroleum ether, kerosene, cyclohexane, cyclooctane, benzene, toluene, xylene, diethyl ether, dibutyl ether, tetrahydrofurane, dioxane, actone, methyl ethyl ketone, chloroform, carbon tetrachloride, ethylene chloride and trichloroethylene or alcohols such as methanol, ethanol, propanol, butanol, cyclohexanol or methyl cyclohexanol. The inert solvent may preferably be added in an amount of about 20 to 80% by weight with reference to the total reaction mixture.

A convenient method of carrying out the reaction in accordance with the invention comprises dissolving or suspending the aromatic hydroxy compound in water or in the mixture of water and any of the inert solvents. To this solution or suspension the sulfonic acid chloride and the base are then added at the desired temperature simultaneously, the speed at which the two components are added being governed by the pH value of the mixture. It is preferable to provide for good mixing during the addition of the said compounds, for example, by means of an efficient stirrer. It is recommended to continue stirring the reaction mixture for some time after the sulfonic acid chloride and the base have been added, in order to complete the reaction. The reaction mixture can subsequently be acidified. The water-insoluble reaction product is separated in conventional manner. Some of the alpha, beta-olefinic unsaturated sulfonic acid esters are solid and can be purified by recrystallization, for example, from methanol, preferably after a preceding distillation at reduced pressure. Some others are obtained sufficiently pure after the distillation or even after the evaporation of the solvent.

The alpha, beta-olefinic unsaturated sulfonic acid esters of aromatic hydroxy compounds are high-quality co-monomers. They can be co-polymerized, for example, with unsaturated compounds, such as vinyl and vinylidene compounds, other than said vinylsulfonic acid esters. The vinylsulfonic acid esters of phenols can also be used as plasticizers, especially after having been reacted with long-chain alkanols.

The process in accordance with the invention is further illustrated by the following examples. The parts given are parts by weight.

*Example 1*

700 parts of phenol are dissolved and suspended, respectively, in 2500 parts of water and 250 parts of ethylene chloride. To this mixture there are added simultaneously from separate containers, within 4 to 5 hours, 815 parts of beta-chloroethane sulfonic acid chloride and about 1820 parts of 25% aqueous sodium hydroxide solution, the pH of the mixture being kept at 9.5. During the addition the temperature is maintained at about 25° C. by external cooling. The reaction mixture is stirred for two more hours at the same temperature. Diluted sulfuric acid is then added until the reaction is acidic to Congo red. The organic layer is separated and dried with sodium sulfate. The ethylene chloride is evaporated under diminished pressure and the residue distilled in vacuo. The first fraction is excessive phenol having a boiling point up to 70° C. at 0.2 mm. Hg absolute. There are obtained 668 parts of vinylsulfonic acid phenyl ester having a boiling point of 90° to 91° C. at 0.1 mm. Hg absolute. The product has the refraction index $n_D^{40}=1.5171$ and solidifies to form rhombic colorless crystals. The yield with reference to the beta-chlorosulfonic acid chloride is 72% of the theory.

*Example 2*

650 parts of para-chlorophenol are dissolved and suspended, respectively, in 3000 parts of water and 500 parts of ethylene chloride. As described in Example 1, 815 parts of beta-chloroethane sulfonic acid chloride and 1600 parts of 25% aqueous sodium hydroxide solution are added within 5 to 6 hours, the temperature being kept at 5° C. and the pH value at 9.5. The reaction mixture is stirred for two more hours and subsequently adjusted to pH 3 by addition of diluted hydrochloric acid. The lower organic layer is separated and dried with sodium sulfate. The ethylene chloride is evaporated under diminished pressure and non-reacted para-chlorophenol is distilled off, the temperature being 93° C. and the pressure 0.1 mm. Hg absolute. There are obtained 763 parts of vinylsulfonic acid para-chlorophenyl ester, corresponding to 70% of the theory. The boiling point of the product is 105° to 110° C. at 0.1 to 0.2 mm. Hg absolute. The refraction index of the colorless liquid is $n_D^{40}=1.5315$. The liquid solidifies after some time to form colorless rhombic crystals.

Example 3

800 parts of 2,4,5-trichlorophenol are dissolved in 5000 parts of water and 100 parts of ethylene chloride. As described in Example 1, 1600 parts of aqueous 25% sodium hydroxide solution and 600 parts of beta-chloroethane sulfonic acid chloride are added within 4 to 6 hours. The mixture is stirred for another hour and has then added to it diluted hydrochloric acid until the reaction is acidic to Congo red. The lower organic layer is separated and extracted with 1 to 2% aqueous sodium hydroxide solution in order to remove non-reacted 2,4,5-trichlorophenol. 310 parts of 2,4,5-trichlorophenol are recovered in this way.

The solution is subsequently acidified and dried with sodium sulfate. By distillation in vacuo there are obtained 641 parts of vinylsulfonic acid 2,4,5-trichlorophenyl ester, having a boiling point of 160° C. at a pressure of 0.2 mm. Hg absolute. The liquid solidifies to form colorless crystals having a melting point of 45° C. The yield is 90% of the theory with reference to the trichlorophenol feed.

Example 4

1200 parts of 2,4,6-trichlorophenol are dispersed in 2500 parts of water and 500 parts of ethylene chloride. 1090 parts of beta-chloroethane sulfonic acid chloride and about 2300 parts of 25% aqueous sodium hydroxide solution are simultaneously introduced into this mixture, the temperature being kept at 5° C. and the pH value being adjusted to 9.5. The reaction takes about 3 to 4 hours. The pH value of the reaction mixture is adjusted to 5.5 by the addition of diluted sulfuric acid. The organic layer is separated and dried with sodium sulfate. 1012 parts of vinylsulfonic acid 2,4,6-trichlorophenyl ester having a boiling point of 131° to 133° C. at 0.1 mm. Hg absolute are obtained. The colorless oil has a refraction index of $n_D^{40} = 1.5650$; it solidifies to form colorless prisms. 362 parts of 2,4,6-trichlorophenol are recovered as a lower boiling fraction. The yield corresponds to 1012 parts, corresponding to 82% of the theory with reference to the amount of the trichlorophenol feed.

Example 5

759 parts of 2,3,4,5,6-pentachlorophenol are dissolved in a mixture of 264 parts of aqueous 50% sodium hydroxide solution and 5000 parts of water. At a temperature of 5° C. and at a pH value of 9.0 to 9.5 there are added simultaneously 370 parts of beta-chloroethane sulfonic acid chloride and 1400 parts of 25% aqueous sodium hydroxide solution.

When the reaction is complete, the reaction mixture is stirred with diluted sodium hydroxide solution to remove non-reacted 2,3,4,5,6-pentachlorophenol. 525 parts of pentachlorophenol are thereby recovered.

By distillation of the organic phase there is obtained the vinylsulfonic acid 2,3,4,5,6-pentachlorophenyl ester having a boiling point of 190° C. at 0.2 mm. Hg absolute. The product solidifies to form colorless crystals having a melting point of 93° C. after recrystallization from ethanol. The yield is 86% of the theory with reference to the amount of the pentachlorophenol feed.

Example 6

900 parts of para-tertiary-butylphenol are dispersed in 3000 parts of water and 900 parts of ethylene chloride. To this mixture there are added simultaneously 978 parts of beta-chloroethane sulfonic acid chloride and about 1950 parts of 25% aqueous sodium hydroxide solution. The temperature is kept at 5° to 10° C. and the pH value at 9.5. The reaction mixture becomes highly viscous and vigorous stirring is needed. After a reaction time of 3 to 4 hours the pH value of the reaction mixture is adjusted to 3 to 4 by adding dilute sulfuric acid. The reaction mixture is subsequently extracted with about 3000 parts of benzene. The benzene layer is separated, the benzene evaporated and the residue distilled in vacuo. There are obtained 260 parts of para-tertiary-butylphenol as a low boiling fraction and 921 parts of vinylsulfonic acid para-tertiary-butylphenyl ester as a colorless liquid having a boiling point of 117° to 119° C. at 0.1 mm. Hg absolute and a refraction index of $n_D^{25} = 1.5130$. The yield corresponding to 90% of the theory with reference to the butyl phenol feed amounts to 921 parts.

Example 7

In a reaction vessel there are dissolved 1220 parts of resorcinol in 1000 parts of water and 3000 parts of ethylene chloride. At a temperature of 25° C. and a pH value of 9.0 to 9.5 there are added simultaneously, while stirring, 3900 parts of beta-chloroethane sulfonic acid chloride and about 8000 parts of aqueous 25% sodium hydroxide solution. At the end of the reaction the pH value is adjusted to 11 and the reaction mixture is stirred for two more hours. The organic phase is separated and washed with water. The ethylene chloride is expelled by vapor. The organic phase is subsequently freed of traces of water in a falling-film evaporator at 100° C. and 20 mm. Hg absolute. There are obtained 2950 parts of resorcinol bis-vinylsulfonate corresponding to a 90% yield with reference to the resorcinol feed. The product solidifies after some time.

Example 8

375 parts of ethylene chloride and 750 parts of water are mixed with a solution of 427.5 parts of 4-chloro-2-methyl phenol in 150 parts of acetone. To this mixture 489 parts of beta-chloroethane sulfonic acid chloride and 985 parts of aqueous 25% sodium hydroxide solution are added, the pH value being adjusted to 9.0–9.5 and the temperature being kept at 0° to 5° C. The reaction takes 2 hours. The organic layer is separated, dried with sodium sulfate and distilled under diminished pressure. There are obtained 70 parts of a low boiling fraction having a boiling point of 150° C. at 1 mm. Hg absolute and consisting mainly of unreacted feed stock. The main fraction is 483 parts of vinylsulfonic acid 4-chloro-2-methylphenyl ester boiling at 153° to 159° C. at 1 mm. Hg absolute. The colorless oil solidifies after some time to form crystals with the melting point 52° to 53° C. The yield is 80% of the theory with reference to the 4-chloro-2-methyl phenol feed.

Example 9

440 parts of nonylphenol are emulsified in 250 parts of ethylene chloride, 600 parts of acetone and 1000 parts of water. To this emulsion there are added, while stirring and cooling, 408 parts of beta-chloroethane sulfonic acid chloride and 865 parts of aqueous 25% sodium hydroxide solution. The temperature during the addition is 0° to 5° C., the pH value being kept at 9.0 to 9.5. The reaction mixture is stirred for another hour. The organic layer is separated and washed twice with diluted sodium hydroxide solution. The organic phase is dried and freed of solvent in vacuo. There are obtained as a residue 525 parts of vinylsulfonic acid nonylphenyl ester in the form of a colorless viscous oil having the refraction index $n_D^{40} = 1.5000$.

Example 10

141 parts of phenol are dissolved in 250 parts of ethylene chloride and 500 parts of water. There are added while stirring 177 parts of 2-chloropropane sulfonic acid-(1) chloride and 344 parts of 25% aqueous sodium hydroxide solution. The temperature is 0° C., the pH value 9.0 to 9.5. The reaction mixture is stirred for another hour and the organic phase is separated, dried and distilled in vacuo. The excessive phenol is obtained as a first fraction having a low boiling point. 125 parts of propene-(1)-yl sulfonic acid-(1) phenyl ester of the boiling point 121° to 126° C. at 0.3 mm. Hg absolute are obtained. The product is a colorless liquid having the refraction index $n_D^{20} = 1.5230$.

Example 11

456 parts of 2,2-bis-(4'-hydroxyphenyl)-propane are dissolved in a mixture of 600 parts of acetone, 800 parts of methylene chloride and 1000 parts of water. To this mixture there are added at a temperature of 0° to 5° C. and a pH value of 9.5, 390 parts of beta-chloroethane sulfonic acid chloride and 802 parts of 25% aqueous sodium hydroxide solution. The reaction is complete after about 3 hours. The reaction mixture is then stirred for another hour. 500 parts of acetone are added and the organic layer is separated and dried with sodium sulfate. The solvent is removed in vacuo at 100° C. in a falling-film evaporator. As a residue 620 parts of the clear, highly viscous and nearly colorless monovinyl sulfonic acid ester of the 2,2-bis-(4'-hydroxyphenyl)-propane are obtained.

Example 12

250 parts of 4,4'-dihydroxy diphenyl sulfone are dissolved in 700 parts of acetone, 600 parts of methylene chloride and 750 parts of water. To this solution there are added at a pH value of 9 to 9.15 and at a temperature of 0° to 5° C., 358 parts of beta-chloroethane sulfonic acid chloride and 757 parts of 25% aqueous sodium hydroxide solution. The reaction takes 2½ hours. The reaction mixture is stirred for two more hours at a pH value of 9.5. The organic phase is separated and extracted with 2000 parts of saturated aqueous sodium chloride solution, dried with sodium sulfate and freed of the solvent at a temperature of 100° C. in a falling-film evaporator at diminished pressure. There are left 404 parts of the bis-vinylsulfonic acid ester of the 4,4'-dihydroxy diphenyl sulfone as a colorless viscous liquid which solidifies after some time.

Example 13

524 parts of dodecyl phenol are suspended in 250 parts of ethylene chloride, 600 parts of water and 600 parts of acetone. To the suspension there are added within 2 hours, while stirring, 408 parts of beta-chloroethane sulfonic acid chloride and about 960 parts of 25% sodium hydroxide solution. The temperature is maintained at 0° to 5° C. and the pH value is adjusted to 9.0–9.5. The reaction mixture is additionally stirred for about half an hour. The organic layer is washed out twice with dilute sodium hydroxide solution and once with water. The ethylene chloride and traces of water are removed in vacuo. There are obtained as a residue 535 parts of a yellow oil having the refraction index $n_D^{20} = 1.5055$. The yield of vinylsulfonic acid dodecyl phenyl ester is 76% of the theory with reference to the dodecyl phenol feed.

Example 14

993 parts of 2,4,6-tribromophenol are suspended in 1000 parts of acetone, 1500 parts of ethyl chloride and 1000 parts of water, while stirring. At a temperature of 0° to 5° C. and at a pH value of 9.2 to 9.5, 652 parts of beta-chloroethane sulfonic acid chloride and 1310 parts of 25% aqueous sodium hydroxide solution are introduced into this mixture dropwise from separate containers. The mixture is stirred for another hour and the organic phase is separated. The sodium salt of the 2,4,6-tribromophenoxyethanesulfonic acid is filtered off and the organic phase is then washed twice with an alkaline and once with a neutral medium and then dried with sodium sulfate. The solvent is removed in vacuo, the residue crystallizing out. There are obtained 943 parts (75% of the theory) of 2,4,6-tribromophenolvinylsulfonic acid ester which melts at 81.5° to 82.5° C. after redissolution from methanol.

Example 15

3090 parts of octylphenol are dispersed in 3000 parts of ethylene chloride, 500 parts of acetone and 1000 parts of water, while stirring. Into the dispersion there are introduced simultaneously, within 4 hours, 2685 parts of beta-chloroethane sulfonic acid chloride and 5400 parts of a 25 % aqueous sodium hydroxide solution, while stirring. The temperature is 0°–5° C., the pH value 9.3 to 9.5. The mixture is stirred for another hour. The organic phase is then separated and washed twice with dilute sodium hydroxide solution and once with water. The solvent and any traces of water are removed in a falling-film evaporator in vacuo. There are obtained as a residue 3570 parts of vinylsulfonic acid octylphenyl ester as a yellow oil having the refraction index $n_D^{20} = 1.5105$. The yield corresponds to 80.5% of the theory with reference to the octylphenol feed.

Example 16

540 parts of cresol are suspended in 500 parts of ethylene chloride and 750 parts of water. Within 2 to 3 hours there are added simultaneously, while stirring, 896 parts of beta-chloroethane sulfonic acid chloride and 1860 parts of 25% aqueous sodium hydroxide solution. The temperature is maintained at 0° to 5° C. and the pH value adjusted to 9.0–9.5. After stirring the mixture for another half hour dilute sulfuric acid is added until the pH value is 4.0. The organic layer is separated and washed with water. By distillation there are recovered 44 parts of cresol and 778 parts of vinylsulfonic acid cresyl ester as a colorless oil having the boiling point 143° to 148° C. at 7 mm. Hg absolute. The oil has the refraction index $n_D^{20} = 1.5220$. The yield corresponds to 86% of the theory with reference to the cresol feed.

I claim:

1. A process for the production of esters of alpha, beta-unsaturated sulfonic acids with aromatic hydroxy compounds which comprises reacting a sulfonic acid chloride of the general formula:

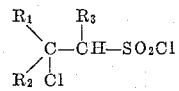

in which $R_1$, $R_2$ and $R_3$ represent members selected from the group consisting of hydrogen, chlorine, lower alkyl and lower chloro alkyl, said alkyl containing 1 to 4 carbon atoms, with an aromatic carbocyclic compound having from 1 to 3 carbocyclic aromatic rings and having from 1 to 3 hydroxy groups directly attached to a ring carbon atom, said reaction being carried out at an alkaline pH and in the presence of a substantial amount of water.

2. A process as in claim 1 wherein the process is carried out with from 30 to 80% by weight of water with reference to the total reaction mixture, and wherein the reaction is carried out at a pH of from 7.5 to 11.5.

3. A process for the production of vinyl sulfonic acid esters of phenol which comprises reacting beta-chloroethane sulfochloride with phenol in the presence of from 30 to 80% by weight of water and at a pH of from 7.5 to 11.5.

References Cited in the file of this patent

UNITED STATES PATENTS

| | | |
|---|---|---|
| 2,348,705 | Alderman et al. | May 16, 1944 |
| 2,529,494 | Harris et al. | Nov. 14, 1950 |

UNITED STATES PATENT OFFICE
CERTIFICATE OF CORRECTION

Patent No. 3,121,730            February 18, 1964

Harry Distler

It is hereby certified that error appears in the above numbered patent requiring correction and that the said Letters Patent should read as corrected below.

Column 3, line 65, for "actone" read -- acetone --; column 7, lines 44 and 45, for "25% sodium hydroxide" read -- 25% aqueous sodium hydroxide --.

Signed and sealed this 14th day of July 1964.

(SEAL)

Attest:

ESTON G. JOHNSON
Attesting Officer

EDWARD J. BRENNER
Commissioner of Patents